Patented Apr. 9, 1929.

1,708,787

UNITED STATES PATENT OFFICE.

HENRY DREYFUS, OF LONDON, ENGLAND.

MANUFACTURE OF FATTY ACID ESTERS OF CELLULOSE OF HIGH VISCOSITY.

No Drawing. Application filed April 18, 1923, Serial No. 633,016, and in Great Britain May 24, 1922.

This invention relates to the manufacture of new fatty acid esters of cellulose such as cellulose acetate, etc, but, in particular cellulose acetate from cellulose or its near conversion products.

In previous U. S. Patents Nos. 1,278,885, 1,280,974, and 1,280,975, and British Patents, 14,101/1915, 6,463/1915, 101,555 and 100,009 I have described processes for the manufacture of cellulose acetates whereby valuable products can be obtained. The cellulose acetates obtained by these processes are very viscous and produce very viscous solutions, said cellulose acetates being the most viscous known up to the present. They possess particularly valuable properties which render them or their secondary reaction products useful in the manufacture of artificial silk, plastic masses, films, etc. distinguished by their superior physical characteristics of strength and quality.

The present invention aims to make new cellulose esters and especially cellulose acetates, which are much more viscous than the products obtained according to my said patents or any other known process, and capable of giving, whether as primary esterification products or products of further transformation, much stronger and better artificial silk or other technical products than any heretofore obtainable with fatty acid esters of cellulose.

Hitherto acetic acid (about 4 to 6 times the weight cellulose) has been used as a solvent in the process of acetylating cellulose. In these processes acetic anhydride to the extent of 1½ to 6 times the weight of the cellulose is used, the amount of the acetic anhydride usually varying inversely with the amount of acetic used (usually the less acetic acid used the more anhydride).

The applicant has discovered that the acetic acid plays an important part in the production of very viscous products and does not serve merely as a solvent or diluent as has been hitherto generally supposed. This is evidenced by the fact that the acetylation solution obtained by the applicant's process is at least as viscous as the acetylation solution obtained in the prior processes although the dilution may be at least 2 to 3 times as great or more. The applicant has also discovered that the quantity of acetic anhydride taken in excess of that required for the acetylation also plays an important part.

According to the present invention the ratio of acetic acid used in the acetylation or esterification of cellulose is greatly increased from the customary amount of about 4 to 6 parts of the acetic acid to 1 part of cellulose to, for example, with preference from 8 to 12 and even substantially more parts of acetic acid to 1 part of cellulose. This increase in the amount of acetic acid used results in not only a purer and more viscous product but it also enables the esterification to be more easily controlled and hinders the depolymerization of the cellulose molecule. When the cellulose or cellulose conversion product is pretreated with acetic acid or acetic acid containing sulphuric acid before acetylation then the amount of acetic acid used in the acetylation should be very greatly increased, inasmuch as the heat generated under such conditions is very great and difficult to control if small volumes of acetic acid are used.

In the present process, when the sulphuric acid or other strong condensing agent is used, acetic anhydride preferably only to the amount necessary for the required acetylation is employed, namely not more than 3 times the weight of the cellulose and preferably between 1½ to 2½ times the weight of the cellulose. This amount can be increased when weak condensing agents or very small amounts of strong condensing agents are used, or much larger quantities of acetic acid. Weak condensing agents can be used in this process.

In addition to the more efficient temperature control permitted by the use of increased amounts of acetic acid, the hydration of the cellulose before acetylation sets in can be more easily regulated—this without attacking or substantially attacking the molecule of the cellulose. While the acetylation may be carried out under the same conditions as in my above mentioned patents, for example with employment of strong cooling, etc., the increase dilution allows the process to be carried out (although less advantageously) without intensive or strong cooling being required, for example one need not cool down so much, or one may even work at ordinary temperature with water cooling, or, according to the amount of dilution, even without cooling, as the small rise in temperature which may then take place does not have such a detrimental effect. The acetylation reaction with sulphuric acid or strong condensing agents can also be executed without cooling to the low temperature indicated in my prior U. S. Patents 1,278,885 and 1,280,975 and British Patents 14,101/1915 and 6,463/1915, though less advantageously.

It is to be understood that acetic acid as solvent for the acetylation may be wholly or partly replaced by other suitable acids or solvents, or that acetic acid or such other acids or solvents may be partly replaced by solvents or liquids such as chloroform or tetrachlorethane, or even by diluents such as carbon tetrachloride, trichlorethylene, benzol, etc., so long as with such solvents, diluents or mixtures one is able to get a solution by acetylation, but the employment of such other solvents or diluents is not as advantageous as the use of acetic acid alone as solvent. It is understood that such solvents, diluents or mixtures as above referred to will be employed in such quantities as give an increased or greatly increased dilution of the esterification mass as compared with the quantity of acetic acid hitherto usually employed.

The acetic anhydride of the applicant's process can be replaced by other anhydrides to obtain corresponding cellulose esters. The best results appear to be obtained even when the quantity of acetic anhydride is just that necessary for acetylation, or no substantial excess, for example between about 1.5 and 3 times the weight of the cellulose, and preferably between about 1.8 and 2½ times the weight of the cellulose, the exact quantity being each time determined by the reaction, inasmuch as differences of humidity in the cellulose and acetic anhydride percentage and percentage of acetic acid are best ascertained by the acetylation reaction.

It is of course understood that any other condensing agent than sulphuric acid can be used, in which case the reaction conditions, more especially as regards temperature, have to be adjusted accordingly, but sulphuric acid is the best and gives the best results.

In my prior U. S. Patents Reissue 14,338, 1,278,885 and 1,280,975 and prior British Patents 20,977/1911, 6,463/1915 and 14,101/1915 the importance of the amount of sulphuric acid used was stressed inasmuch as it affected the speed of the reaction and the solubility of the final product obtained. It also necessitated more careful temperature control. In the present process this sulphuric acid question is not so difficult, because of the better control of the process, and sulphuric acid up to as much as 25% and as little as 2% or less can be used. Of course in this process the solubility properties of the product will vary with inter alia the amount of sulphuric acid or other strong condensing agent used. (It is to be understood that in all cases the sulphuric acid is calculated in terms of 100% strength).

The following are given as examples of how the process can be carried out but the invention is not to be considered as limited to these examples:—

Example 1.

100 parts by weight of cellulose, for example cotton, are introduced into a mixture of 800 parts by weight of glacial acetic acid, 15%-20% of sulphuric acid relatively to the weight of the cellulose, and about 200 to 250 parts by weight of acetic anhydride, this mixture having been first cooled down to 0° C.; the temperature is allowed to rise gradually, cooling being continued until complete solution. The reaction is complete in about 2 to 6 hours. If desired, the temperature towards the end of the reaction may be allowed to rise to 25° or 30° C. or even somewhat more to finish the reaction. The cellulose acetate obtained is of much higher viscosity than any hitherto known, as is proved by the fact that the acetylation solution obtained is, in spite of the 70% greater dilution, just as viscous as the best acetylation solutions previously obtainable, for example those obtained according to my said patents previously referred to. The product can be isolated and employed as such or be submitted to a secondary or further treatment either in the original acetylation solution or after isolation therefrom. The isolation of the product from the acetylation solution may be effected by precipitating it in water or with water or with diluents such as carbon tetrachloride and so forth.

Example 2.

100 parts by weight of cellulose, for example cotton, are treated with 900 to 1000 parts by weight of glacial acetic acid and 10 to 15 parts by weight of sulphuric acid for about 1 to 2 hours. Into the mixture, cooled to about 0°-10° C. or still lower, are introduced 200 parts of acetic anhydride, the mass being constantly mixed or worked while maintaining cooling until complete solution, so that the temperature is only allowed to rise gradually to about 10° to 15° C. If desired, the temperature may be allowed to rise to 20°-25° C. to complete the reaction or even to about 30° C. The acetylation reaction is finished in about 1 to 3 hours.

Instead of introducing the sulphuric acid with the acetic acid in the preliminary treatment, it may be introduced after treatment with acetic acid, with or without cooling, but preferably with cooling.

Example 3.

To 100 parts by weight of cellulose, more than 400 to 500 parts, for example 800 parts of acetic acid or more, are used together with say 15% or 20% of sulphuric acid, and after the cellulose has been incorporated with this mixture, the resulting mixture, cooled down to about 1° C., is introduced into a mixture of 1500 parts by weight of benzol and 200 to 300 parts by weight of acetic anhydride, calculated on the weight of the cellulose, this mixture having been likewise cooled down to about 1° C., and the temperature being allowed to rise gradually to 15°–20° C. or even 25° to 30° C. or somewhat more. The reaction is finished in about 3 to 6 hours.

Instead of following the temperature conditions indicated in the above examples, one may also, as before explained, start at higher temperatures, e. g. 5°, 10° or 15° and higher without precooling, or one may, though with less advantage, only use water cooling or like moderate cooling during the reaction or in the early part thereof especially when the sulphuric acid quantity is reduced to 5% or 2% or less. It should be remembered that it is better to keep the temperature down, especially in the early part of the reaction, particularly when larger quantities of sulphuric acid are used, but even for small quantities such as 5% to 2% and less, precooling or cooling is an advantage. It is to be understood that in all cases mentioned in this application the sulphuric acid is reckoned as of 100% strength.

The reaction goes more slowly in proportion as the quantity of condensing agent is reduced, and in such case more acetic anhydride may be employed.

The exact order in which the various reagents are added to the cellulose or cellulose conversion products may be varied. For example the cellulose etc. may first be treated with acetic acid, in the cold or with heating, and then sulphuric acid, or other strong condensing agent, preferably diluted with acetic acid, is added at ordinary temperature or when cooling and the acetic anhydride then added to esterify; or after the initial addition of acetic acid, the acetic anhydride can be added and finally the sulphuric acid or other strong condensing agent is added to the cooled mixture; or the acetic acid and sulphuric acid can be added together in the initial step. Other variations and modifications will readily suggest themselves and are included within the scope of this invention. When sulphuric acid or other strong condensing agents are used, the acetylizing mixture should be preferably cooled to 0 to 5° C. or lower before or at the beginning of the esterification.

The reaction according to the present invention may also be executed in suspension, in which case the cellulose is preferably treated beforehand with a mixture of the increased quantity of acetic acid or corresponding diluent or mixture containing the sulphuric acid or condensing agent, and afterwards introduced into a mixture of the necessary quantity of the acetic anhydride or other anhydride and a given nonsolvent diluent, like benzol or carbon tetrachloride or any other suitable diluent, employed in sufficient quantity to prevent solution of the cellulose.

In order to speed up the reaction the cellulose or cellulose conversion product may receive a pretreatment with concentrated or dilute acetic acid or other organic (fatty) acid, at ordinary temperature or with cooling or at elevated or even boiling temperatures. The acid, preferably, should contain small quantities of sodium acetate or other suitable agents capable of neutralizing any mineral acid which may be present, since the latter would have a destructive effect on the cellulose molecule when the high temperatures are used. The duration of this treatment and the temperatures utilized will depend on the acid used and its concentration. The details of this pretreatment are here omitted since it forms the subject matter of a divisional application, Serial No. 81,838, filed January 16, 1926.

The primary cellulose acetates or cellulose esters obtained according to the present invention can either be used directly as such for any technical purposes, like the manufacture of artificial silk, celluloid-like masses, films, varnishes, etc., especially when they are directly soluble in acetone or dilute acetone; or they may be first submitted to a further or secondary treatment or reaction, either in the original esterification solution or after isolation therefrom, and either in solution or suspension.

Such further so called secondary treatment may be along the lines indicated in my British Patents 20,977/1911 and 20,852/1912 or in my U. S. Patents 1,217,722 and Reissue 14,338.

In these patents as referred to I have shown how the primary esterification products or their esterification solutions or otherwise made up solutions of them, or in suspension, can be thus transformed by using the direct acetylation solutions or other solutions of the primary esterification products, with or without the addition of water or other similarly acting agents having the effect of destroying acetic anhydride, and which at the same time should preferably be able to be themselves esterified without producing water in any way, even intermediately, as for instance, lactic acid (the absence of water in the treatment or the quantity of water or similarly acting agents used directing the phases of solubilities passed through).

I have also there described inter alia how the esterification solutions can be treated by neutralizing the effect of the condensing agent partially or completely and can be submitted in such form to a secondary treatment, either at ordinary temperature or with heating to a higher temperature for accelerating the reaction (such as 50° to 100° C. or more), that is to say by having really only free organic acids, as explained for example in my U. S. Patent 1,217,722, page 4, lines 119–128.

Further, I have shown in my said patents that the weaker the condensing agent the more water or similarly acting agents one can use in the secondary reaction for getting given phases of solubilities, while however not excluding the use of less or of no water or similarly acting agents, for passing through many more phases of solubilities more slowly and therefore more distinctly, while if the condensing agents are stronger the quantities of water or similarly acting agents have to be reduced in order to get certain solubilities based on a given acetylation or esterification solution, unless certain or given phase solubilities are to be passed over or never appear.

For the sake of brevity, only these facts are mentioned, but for details reference may be had to the above mentioned patents where these matters are fully explained.

It is understood, however, that the various solubilities developed in the secondary reaction or treatment of the products of the present invention do not necessarily correspond to those developed in the products obtained according to my said previous U. S. Reissue Patent 14,338, and Nos. 1,278,885, 1,280,974, 1,280,975 and my British Patents 20,977/1911, 14,101/1915, 6,463/1915, 100,009, inasmuch as the primary acetylation or esterification products obtainable by the new process of the present invention may have other solubilities than those produced according to my said previous patents owing to the greater range and adaptability which is permitted by the increased dilution of the esterification solutions in which the new remarkably viscous esterification products of the present invention are obtained.

Further, any other processes of secondary reaction or further treatment may be applied to the primary esterification products obtained according to the present invention.

What I claim and desire to secure by Letters Patent is:—

1. Process for the manufacture of cellulose esters of much higher viscosity than previously known, characterized in that the esterification of cellulose is performed with a strong condensing agent in presence of a quantity over about 6 times the weight of the cellulose of organic solvent non-esterifiable by fatty acid anhydrides.

2. Process for the manufacture of cellulose esters of much higher viscosity than previously known, characterized in that the esterification of cellulose is perfomed with a strong condensing agent in presence of a quantity of acetic acid over about 6 times the weight of the cellulose.

3. Process for the manufacture of cellulose acetate of much higher viscosity than previously known, characterized in that the acetylation of cellulose is performed with acetic anhydride and strong condensing agent in presence of a quantity over about 6 times the weight of the cellulose of organic solvent non-esterifiable by fatty acid anhydrides.

4. Process for the manufatcure of cellulose acetate of much higher viscosity than previously known, characterized in that the acetylation of cellulose is performed with acetic anhydride and strong condensing agent in presence of a quantity of acetic acid over about 6 times the weight of the cellulose.

5. Process for the manufacture of cellulose acetate of much higher viscosity than previously known, characterized in that the acetylation of cellulose is performed with acetic anhydrid and sulfuric acid in presence of a quantity over about 6 times the weight of the cellulose of organic solvent non-esterifiable by fatty acid anhydrides.

6. Process for the manufacture of cellulose acetate of much higher viscosity than previously known, characterized, in that the acetylation of cellulose is performed with acetic anhydrid and sulfuric acid in presence of a quantity of acetic acid over about 12 times the weight of the cellulose at from about 0° C. to about ordinary temperature.

7. Process for the manufacture of cellulose acetate of much higher viscosity than previously known, characterized in that the acetylation of cellulose is performed with acetic anhydrid and sulfuric acid in presence of a quantity of acetic acid between about 6 and about 50 times the weight of the cellulose.

8. Process for the manufacture of cellulose acetate of much higher viscosity than hitherto known, characterized in that the acetylation of cellulose is performed with acetic anhydrid and strong condensing agent in presence of a quantity over about 6 times the weight of the cellulose of organic solvent non-esterifiable by organic acid anhydrides, the acetylation mixture being precooled to at least about 0° to 5° C. and the acetylation conducted with cooling so that the temperature does not rise above about 35° C. during acetylation.

9. Process for the manufacture of cellulose acetate of much higher viscosity than hitherto known, characterized in that the acetylation of cellulose is performed with acetic anhydrid and sulfuric acid in presence of a quantity of acetic acid over about 6 times the weight of the cellulose, the acetylation mixture being precooled to at least about 0° to 5° C. and the acetylation conducted with cooling so that the temperature does not rise above about 35° during acetylation.

10. Process for the manufacture of cellulose acetate of much higher viscosity than hitherto known, characterized in that the acetylation of cellulose is performed at temperatures not exceeding about ordinary temperature with acetic anhydrid and sulfuric acid in presence of a quantity of acetic acid over about 12 times the weight of the cellulose.

11. Process for the manufacture of cellulose acetate of much higher viscosity than hitherto known, characterized in that the acetylation of cellulose is performed at temperatures not exceeding about ordinary temperature, with acetic anhydrid and sulfuric acid in presence of a quantity of acetic acid over about 20 times the weight of the cellulose.

12. Process for the manufacture of cellulose acetate of much higher viscosity than hitherto known, characterized in that the acetylation of cellulose is performed with acetic anhydrid and sulfuric acid in presence of a quantity of acetic acid over about 8 times the weight of the cellulose, the acetylation being started between about 0° and about 15° C.

13. Process for the manufacture of cellulose acetate of much higher viscosity than hitherto known, characterized in that the acetylation of cellulose is performed with acetic anhydrid and sulfuric acid in presence of a quantity of acetic acid over about 8 times the weight of the cellulose and with employment of about 1 to 25% of sulphuric acid relatively to the weight of the cellulose, the acetylation mixture being precooled to below about 5° C. and the temperature not exceeding about 35° C. during acetylation.

14. Process for the manufacture of cellulose acetate of much higher viscosity than hitherto known, characterized in that the acetylation of cellulose is performed with acetic anhydrid and about 1 to 5 per cent of sulfuric acid relatively to the weight of the cellulose, in presence of a quantity of acetic acid over about 8 times the weight of the cellulose, the acetylation being started between about 0° C. and ordinary temperature.

15. Process for the manufacture of cellulose acetate of much higher viscosity than hitherto known, characterized in that the acetylation is performed with acetic anhydrid and sulphuric acid in presence of a quantity of acetic acid about twenty times the weight of the cellulose, the acetylation being started at a temperature between about 5° C. and about ordinary temperature.

16. Process for the manufacture of cellulose acetate of much higher viscosity than hitherto known, characterized in that the acetylation is performed with acetic anhydrid and sulphuric acid in presence of a quantity greater than about 6 times the weight of the cellulose of organic solvent non-esterifiable by fatty acid anhydrides and with employment of a non-solvent diluent in sufficient quantity to prevent dissolution of the cellulose acetate by the organic solvent.

17. Process for the manufacture of cellulose acetate of much higher viscosity than hitherto known, characterized in that the acetylation is performed with acetic anhydrid and sulfuric acid in presence of a quantity of acetic acid greater than about 8 times the weight of the cellulose and with employment of a non-solvent diluent in sufficient quantity to prevent dissolution of the cellulose acetate by the organic solvent.

18. Process for the manufacture of cellulose acetate of much higher viscosity than hitherto known, characterized in that the primary acetylation of cellulose is performed with acetic anhydrid and sulfuric acid in presence of a quantity greater than about 6 times the weight of the cellulose of organic solvent non-esterifiable by fatty acid anhydrides and that the resulting cellulose acetate is subjected to further treatment to modify the solubility characteristics thereof.

19. Process for the manufacture of cellulose acetate of much higher viscosity than hitherto known, characterized in that the primary acetylation of cellulose is performed with acetic anhydrid and sulphuric acid in presence of a quantity greater than about six times the weight of the cellulose of organic solvent non-esterifiable by fatty acid anhydrides and that the resulting cellulose acetate is subjected to further treatment in presence of an acetic anhydrid destroying agent to modify the solubility characteristic thereof.

20. Process for the manufacture of cellulose acetate of much higher viscosity than hitherto known, characterized by that the primary acetylation of cellulose is performed with acetic anhydrid and sulphuric acid in presence of a quantity greater than about six times the weight of the cellulose of organic solvent non-esterifiable by fatty acid anhydrides and that the resulting cellulose acetate is subjected to further treatment in presence of an agent capable of desroying acetic anhydride without forming water, to modify the solubility characteristics of the cellulose acetate.

21. Process for the manufacture of cellulose acetate of much higher viscosity than previously known, characterized in that the acetylation of cellulose is performed with acetic anhydride and strong condensing agent in presence of a quantity over about 8 times the weight of the cellulose of organic solvent non-esterifiable by fatty acid anhydride.

22. Process for the manufacture of cellulose acetate of much higher viscosity than previously known, characterized in that the acetylation of cellulose is performed with acetic anhydride and sulphuric acid in presence of a quantity of acetic acid over about 8 times the weight of the cellulose.

In testimony whereof I have hereunto subscribed my name.

HENRY DREYFUS.